H. G. BEEDE.
EXPANSIBLE PULLEY.
APPLICATION FILED SEPT. 21, 1914.
1,158,886.
Patented Nov. 2, 1915.
2 SHEETS—SHEET 1.
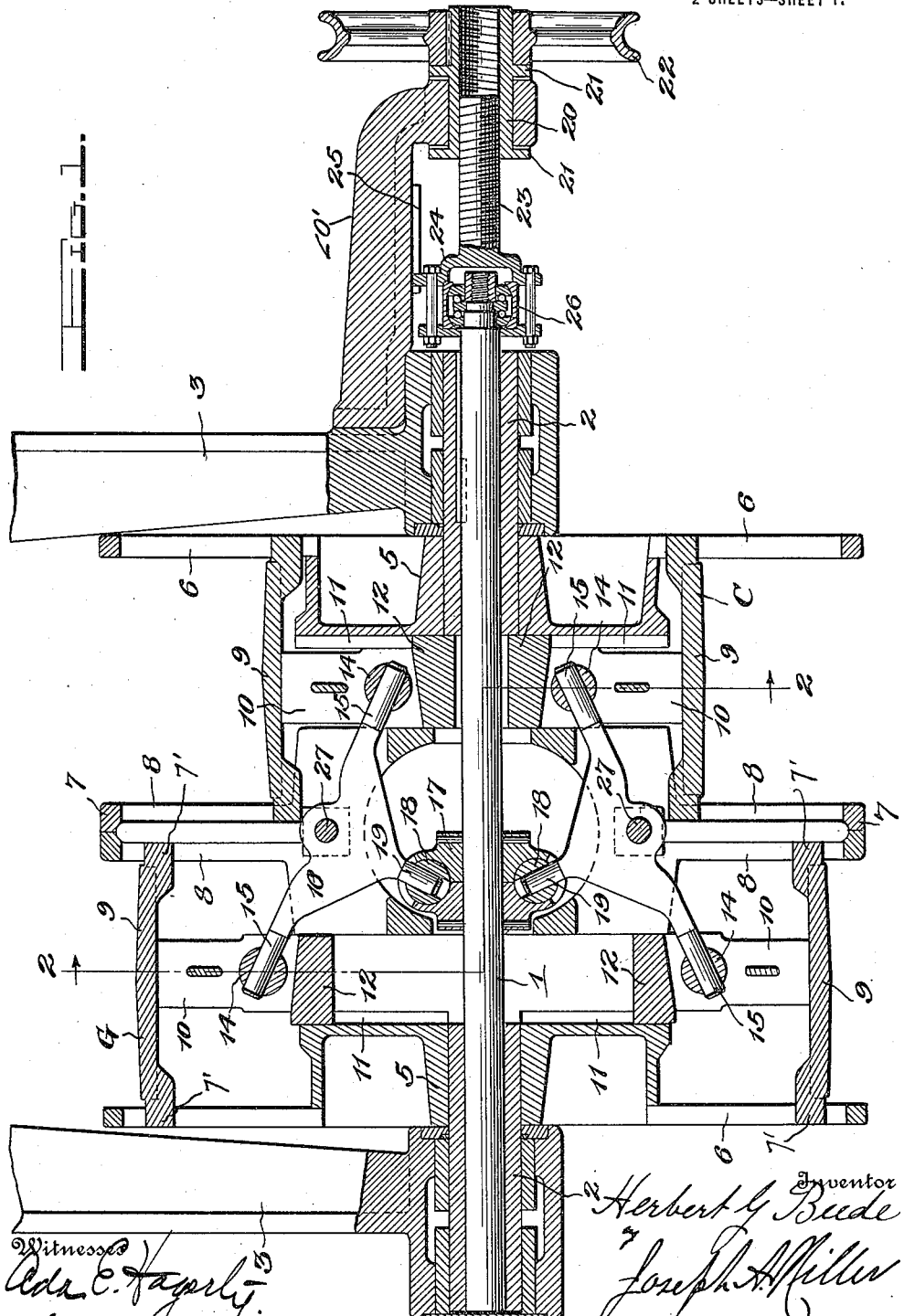
Witnesses
Ada C. Hagerly
Grace A. Davis
Inventor
Herbert G. Beede
by
Joseph A. Miller
Attorney H. G. BEEDE.
EXPANSIBLE PULLEY.
APPLICATION FILED SEPT. 21, 1914.
1,158,886.
Patented Nov. 2, 1915.
2 SHEETS—SHEET 2.
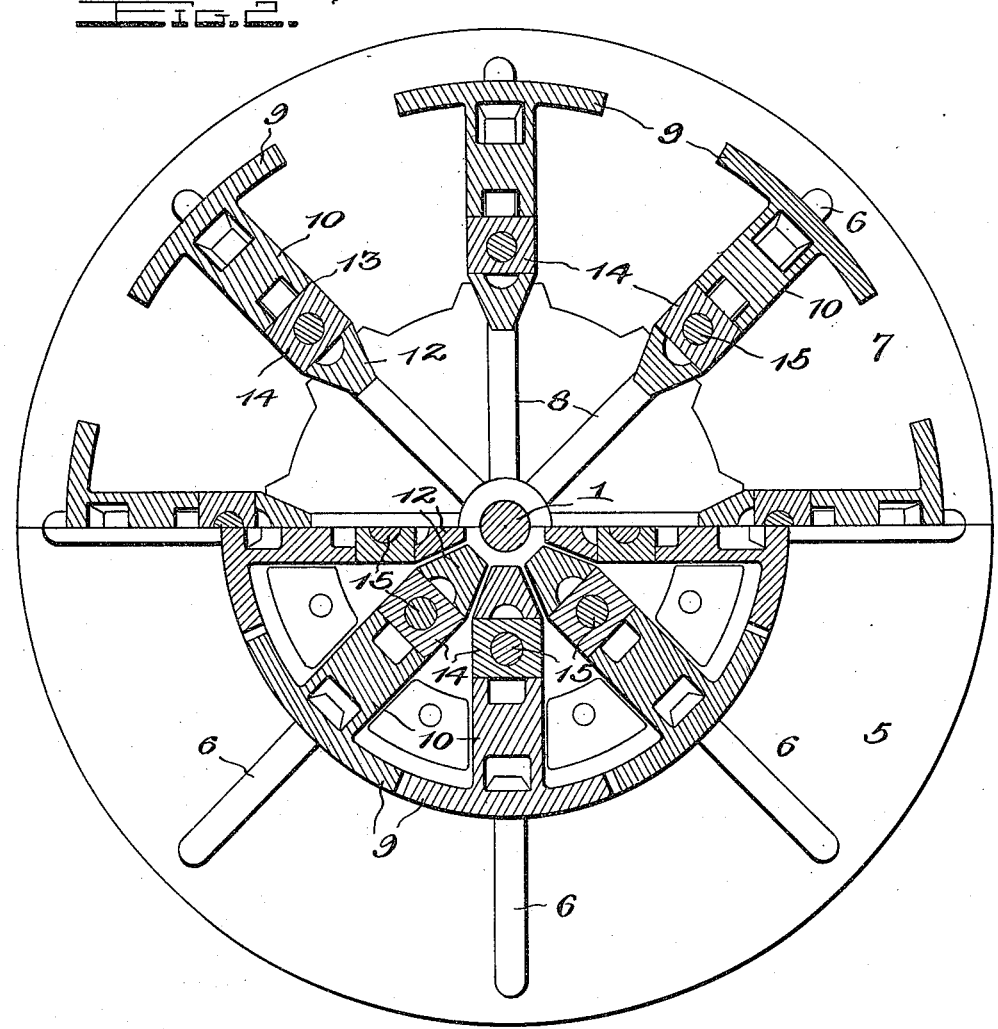
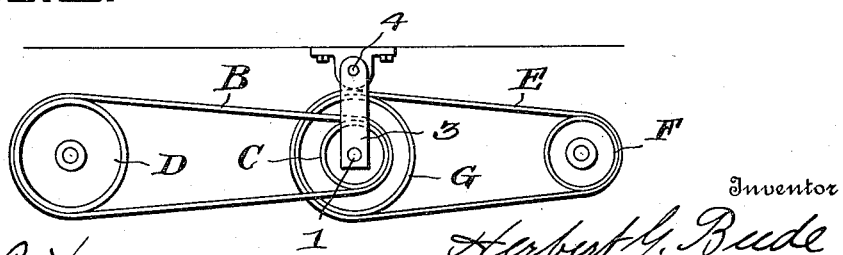

UNITED STATES PATENT OFFICE.

HERBERT G. BEEDE, OF PAWTUCKET, RHODE ISLAND.

EXPANSIBLE PULLEY.

1,158,886.  Specification of Letters Patent.  Patented Nov. 2, 1915.

Application filed September 21, 1914. Serial No. 862,646.

*To all whom it may concern:*

Be it known that I, HERBERT G. BEEDE, a citizen of the United States, residing at Pawtucket, in the county of Providence and State of Rhode Island, have invented a new and useful Improvement in Expansible Pulleys, of which the following is a specification.

This invention relates to certain new and useful improvements in expansible pulleys, and has for its object the provision of a pulley which has two belt engaging portions and means whereby when one portion is expanded the other portion will be contracted, and vice versa.

The invention is particularly adapted for use in connection with a driving and a driven belt and is mounted in a pivotal support and engages each of the two belts.

Further, the invention aims to provide improved means of novel character for effecting simultaneous expansion and contraction of the two pulley belt engaging portions.

In the drawings—Figure 1 is a longitudinal sectional view of the invention. Fig. 2 is a section on the line 2—2 of Fig. 1, and Fig. 3 is a side elevation of the invention as applied operatively to a driving and driven belt.

The invention includes a shaft 1 slidably supported in bearings 2 that are rotatable in hangers 3 which latter are pivotally suspended at 4 from an overhead support.

Suitably secured to the bearings 2 in spaced relation are a pair of similar end disks 5 which are slotted at 6, and are arranged on opposite sides of a central disk 7, which latter is slotted at 8, all of the aforementioned slots being radially disposed and alined with one another, the several disks forming an integral part of the pulley body.

Slidably disposed within the slots 6 and 8 are extensions 7' of a series of arcual shoes 9 which have stems or shanks 10 connected thereto, the stems sliding in guideways 11, that are provided therefor in the body portion of the pulley, and being provided with guides 12 which conformably engage the walls of the guide-ways in the sliding movements of the stems.

The stems are apertured and rotatably receive in said apertures blocks 14, which blocks are also apertured to receive the arms 15 of a three arm lever 16, the arms 15 being slidable in the apertures of the blocks 14.

Rigidly secured to the shaft 1 is a coupling 17, which latter has a series of balls 18 rotatably connected thereto, the balls being apertured to slidably receive the arms 19 of the levers 16. It will be understood that a lever structure 16 as herein described is employed for each pair of shoes 9.

One of the hangers 3 is provided with a bushing 20, which is supported by an arm 20', carried by said hanger. The bushing 20 has collars 21 21 thereon that engage opposite sides of the hanger to hold the bushing against longitudinal or endwise movement relative to the hanger, the bushing being rotatable and having a hand wheel 22 secured thereto for the purpose of enabling rotation of the bushing. The bushing is interiorly threaded and engages with, or receives the threaded end of a shaft 23, which latter has a head 24 which slides in a guide-way 25 provided therefor on the said arm 20'. A coupling 26 connects the head 24 to the shaft 1, so that upon rotation of the handwheel 22 the bushing will move the shaft 23 and there by the shaft 1, either inwardly or outwardly, depending upon the direction of rotation of the handwheel.

The levers 16 are pivoted at 27 to the central disk 7, which latter it will be understood is relatively stationary with respect to shoes 9, and by operation of the handwheel 22, the shaft 1 will be slid lengthwise, moving the coupling therewith, whereby the coupling, being connected to the arms 19 of the levers, will rock the same and move the shoes 9 of the two belt engaging portions of the pulley either inward or outward in relatively opposite directions, thus causing one of the belt engaging parts of the pulley to be expanded or contracted and the other belt engaging part to be contracted or expanded respectively with relation to the first named part.

Referring to Fig. 3 of the drawings, it will be seen that the drive pulley D has its belt B engaged with the part C of the pulley, while the belt E of the driven pulley F is engaged with the other or second part G of the pulley, whereby should it be desirable to increase the diameter of the part C the shaft 1 will be given movement to cause the part C to expand, which movement through the levers 16 causes the part G of the pulley to contract thereby compensating for the variation in the diameters of the pulley belt engaging parts.

Having thus described my invention, I claim as new and desire to secure by Letters Patent;—

1. In an expansible pulley, a slidable shaft, means to support the shaft, a rotatable device to effect sliding of the shaft, a pair of end disks and a central disk on the shaft, said disks being radially slotted, shoes having stems arranged between each end disk and on opposite sides of the central disk, said shoes having parts which engage in the slots of the disks, rotatable apertured blocks carried by the stems, a coupling on the shaft rigidly connected thereto, rotatable apertured blocks on the coupling, and a series of three-arm levers pivoted to the central disk and having one of their arms sliding in the apertures of the blocks of the coupling and their other two arms sliding in the apertures of the blocks of the stems which are disposed between said central disk and the end disks.

2. In an expansible pulley, a slidable shaft, a body thereon, two independent series of shoes movable radially of the body, a series of three arm levers pivoted to the body and having free end parts, a coupling rigid on the shaft, rotatable apertured means borne by the shoes and coupling and slidably receiving the free end parts of the lever arms therein, and means to slide the shaft so that upon sliding the free end parts of the arms will slide in the apertured means and the latter will rotate to effect varying relative in and out positions of the shoes.

In testimony whereof I have signed my name to this specification in the presence of two subscribing witnesses.

HERBERT G. BEEDE.

Witnesses:
EUGENE C. WILLIAMS,
HERBERT J. SUTTON.

Copies of this patent may be obtained for five cents each, by addressing the "Commissioner of Patents, Washington, D. C."